Figure 1:
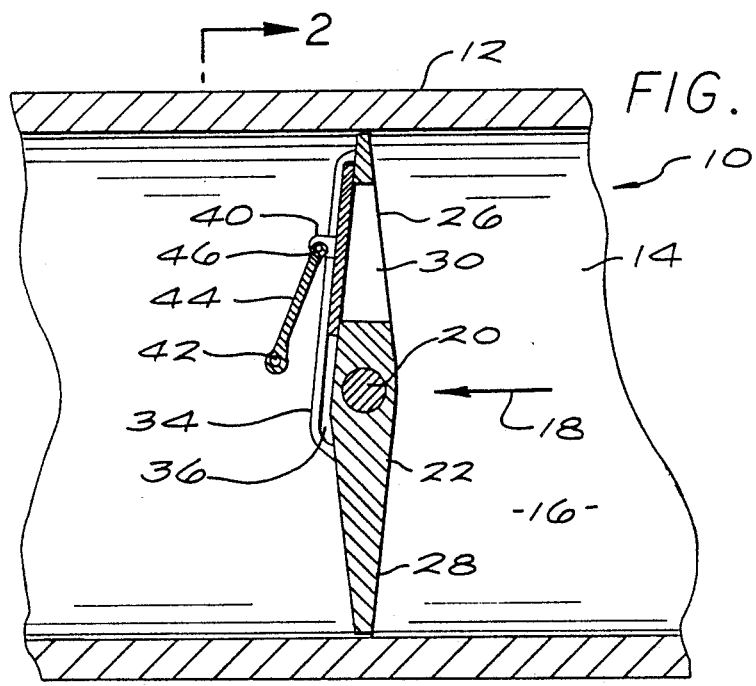

United States Patent [19]
Ball et al.

[11] Patent Number: 4,969,485
[45] Date of Patent: Nov. 13, 1990

[54] BUTTERFLY VALVE APPARATUS AND METHOD

[75] Inventors: Larry K. Ball, Chandler; Joseph R. Black, Mesa, both of Ariz.

[73] Assignee: Allied-Signal Inc., Morris Township, Morris County, N.J.

[21] Appl. No.: 422,487

[22] Filed: Oct. 16, 1989

[51] Int. Cl.[5] .................................................. F16K 1/22
[52] U.S. Cl. .................................. 137/599.2; 251/283; 251/305
[58] Field of Search ........... 137/1, 599.2, 630, 630.15; 251/305, 281, 283

[56] References Cited

U.S. PATENT DOCUMENTS

| | | |
|---|---|---|
| 212,556 | 7/1879 | Johnson . |
| 443,326 | 12/1890 | Leverich . |
| 932,172 | 8/1909 | Porter et al. . |
| 965,322 | 7/1910 | Peterson . |
| 1,167,145 | 1/1916 | Baverey . |
| 1,328,565 | 1/1920 | Howard . |
| 1,541,047 | 6/1925 | Hart . |
| 1,744,798 | 1/1930 | Price . |
| 2,051,881 | 8/1936 | Mock . |
| 2,095,263 | 10/1937 | Moss . |
| 2,271,390 | 1/1942 | Dodson . |
| 2,796,082 | 6/1957 | Green ............................. 137/630.15 |
| 2,833,511 | 5/1958 | Fletcher . |
| 2,910,266 | 10/1959 | Condello et al. . |
| 3,008,685 | 11/1961 | Rudden . |
| 3,062,232 | 11/1962 | McGay . |
| 3,065,950 | 11/1962 | Goldberg . |
| 3,200,838 | 8/1965 | Sheaffer . |
| 3,298,659 | 1/1967 | Cupedo . |
| 3,344,808 | 10/1967 | Cary . |
| 3,400,907 | 9/1968 | Horn et al. . |
| 3,442,489 | 5/1969 | Cary et al. . |
| 3,516,640 | 6/1970 | Bryer et al. . |
| 3,545,486 | 12/1970 | Larson . |
| 3,675,681 | 7/1972 | Obermaler . |
| 3,677,297 | 7/1972 | Walton . |
| 3,794,288 | 2/1974 | Dolder et al. . |
| 3,960,177 | 6/1976 | Baumann . |
| 3,971,414 | 7/1976 | Illing ............................. 137/630.15 |
| 3,982,725 | 9/1976 | Clark . |
| 3,993,096 | 11/1976 | Wilson ............................. 137/599.2 |
| 4,084,617 | 4/1978 | Happe . |
| 4,190,074 | 2/1980 | Mailliet et al. . |
| 4,313,592 | 2/1982 | Baas . |
| 4,367,861 | 1/1983 | Bray et al. . |
| 4,508,132 | 4/1985 | Mayfield, Jr. et al. . |
| 4,534,538 | 8/1985 | Buckley et al. . |
| 4,556,192 | 12/1985 | Ramisch . |
| 4,586,693 | 5/1986 | Tinner . |
| 4,706,706 | 11/1987 | Page et al. . |
| 4,712,768 | 12/1987 | Herr et al. . |

FOREIGN PATENT DOCUMENTS 2821766 11/1979 Fed. Rep. of Germany .
1533073 11/1978 United Kingdom .

OTHER PUBLICATIONS

"Fishtail vs. Conventional Discs in Butterfly Valves", Carl Wilson, Instruments and Control Systems, vol. 41, Mar. 1968.
"The Note on the Reduction of the Fluid Dynamic Torque of Butterfly Valves"; D. W. Bryer; National Physics Laboratory, Aerodynamics Division; Sep. 1986.

Primary Examiner—Robert G. Nilson
Attorney, Agent, or Firm—Terry L. Miller; Joseph R. Black; James W. McFarland

[57] ABSTRACT

A butterfly valve includes a duct defining a fluid flow path and a plate-like valve member pivotal in the duct to in one position span and close the latter. The valve member is pivotal to a second position spanning the duct and extending parallel to the flow path to allow fluid flow therein. Means are provided for altering the effective area distribution of the valve member about its pivot axis to decrease the operating torque required by the inventive valve in comparison with conventional butterfly valves.

20 Claims, 3 Drawing Sheets

BUTTERFLY VALVE APPARATUS AND METHOD

One of the coinventors named on this application is also named as a coinventor on other related applications generally relating to butterfly valves (including Ser. Nos. 374,897, pending filed 30 June 1989; 395,234, pending filed 17 August, 1989, 422,210, pending filed 16 October 1989; 422,354, pending filed 16 October 1989; 422,380, filed 16 October 1989 pending; 426,921 filed 24 October 1989 pending; and 451,659, filed 15 December 1989 pending, all cofiled or copending with the present application, and all assigned to Allied-Signal Inc.

The present invention relates generally to valve apparatus and methods. More particularly, the present invention relates to butterfly valve apparatus and methods wherein a duct defines a flow path for conveying a flow of fluid. A plate-like valve member is pivotally disposed in the duct about a transverse axis, and is conformal at its outer periphery to the internal wall shape of the duct. The valve member is pivotal between a first position transverse to the flow path and substantially sealingly engaging the duct wall to close fluid flow therein, and a second position spanning the flow path generally parallel therewith to allow and control the fluid flow therein.

A conventional butterfly valve is set forth by U.S. Pat. No. 3,971,414, issued 27 July 1976 to H. Illing. The '414 patent also discusses the general state of the butterfly valve art prior to the invention by Illing. According to the teaching of the '414 patent, the actuating torque required to rotate the valve member of a butterfly valve from its closed position to an open position may be reduced by utilizing an articulated valve member. That is, the plate-like butterfly valve member includes a leading wing and a trailing wing with respect to fluid flow. The leading wing of Illing's valve member is defined in part by a servo tab or spoiler tab which is carried by and pivotally movable relative to the remainder of the valve member. By pivoting the spoiler tab ahead of the valve member in the opening direction so as to point into the fluid flow, Illing changes the angulation and effective moment arm of the fluid pressure and flow forces on the spoiler tab. Illing hopes to reduce the total torque opposing opening of the valve member in comparison to previously known butterfly valves. The articulation of the spoiler tab is such that it pivots from an aligned position to move ahead of the valve member during most of the pivotal movement of the latter in the opening direction. During the last portion of the pivotal movement of the valve member to its fully open position, the servo tab reverses its relative pivotal movement and returns to an aligned position achieved when the valve member is fully open. In this way, the valve member and servo tab align with one another and with the fluid flow in the fully open position of the valve member.

A reduction in the operating torque required to move the valve member from its closed to its open position, such as assertedly achieved by the invention of Illing, has been a long-recognized need in the field of butterfly valves. Unfortunately, the invention of Illing as set forth in the '414 patent does not fully comprehend the usual design requirements for a butterfly valve, and has not enjoyed commercial acceptance, to the Applicant's knowledge.

It will be understood by those skilled in the pertinent art that the valve member of a conventional butterfly valve must ordinarily achieve a sealing tight fit with the walls of the duct. Ordinarily the plate-like butterfly valve member carries a seal member at the outer periphery thereof. This seal member, for example, a piston ring type, O-ring, or lip seal, is resiliently and sealingly engageable with the duct wall in the closed position of the valve member. Thus, it is conventional for the plate-like valve member to be circumferentially continuous, and to be skewed slightly relative to the pivot shaft supporting the valve member. That is, the periphery of the valve member is disposed upstream of the shaft on one side and downstream of the shaft on the other to allow use of a circumferentially continuous sealing member at the periphery of the valve member. The pivot shaft may transact the duct perpendicularly to the flow path, or be angulated relative to the latter. The valve taught by the '414 patent does not permit use of a circumferentially continuous sealing member on the valve member periphery.

In view of the deficiencies of the known butterfly valve art it is an object for this invention to reduce or eliminate the opposing torque which must be overcome to move the valve member of a butterfly valve from its closed to its open position.

Desirably, fluid pressure and flow forces acting on the plate-like butterfly valve member may be used to reduce or eliminate the opposing torque, or to effect pivotal movement of the valve member.

Still further, in view of the deficiencies of the valve taught by Illing in the '414 patent, a circumferentially continuous sealing member must be possible of use on the valve member.

Accordingly the present invention provides a duct member defining an axially extending fluid flow path therewithin; a plate-like butterfly valve member disposed in said fluid flow path and pivotal about a generally transverse axis between a first position wherein said valve member is transverse of said duct to close said flow path and a second position wherein said valve member is substantially parallel with said duct to open said flow path: said butterfly valve member including a pair of opposed wing portions on opposite sides of said pivot axis, a leading one of said pair of wing portions with respect to fluid flow in said duct and pivotal movement of said plate member toward said second position defining an aperture therethrough: a secondary valve member carried by said butterfly valve member and movable between a first location closing said aperture and a second location opening said aperture to allow fluid flow therethrough; and linkage means for moving said secondary valve member progressively between said first location and said second location in response to pivotal movement of said valve member between said respective first position and said second position.

An advantage of the present invention is that use of a circumferentially continuous sealing member is possible on the plate-like valve member of the butterfly valve.

Another advantage of the present invention resides in the mechanically simple, and therefore, relatively trouble free, mechanism which may be used to effect coordinated movement of the secondary valve member relative to the plate-like valve member.

Still further, the present invention effects a significant reduction in the opposing torque which must be overcome to open the butterfly valve fully. Consequently, a significantly smaller and lower powered actuator may be employed with a valve according to the present invention.

Figure 2:
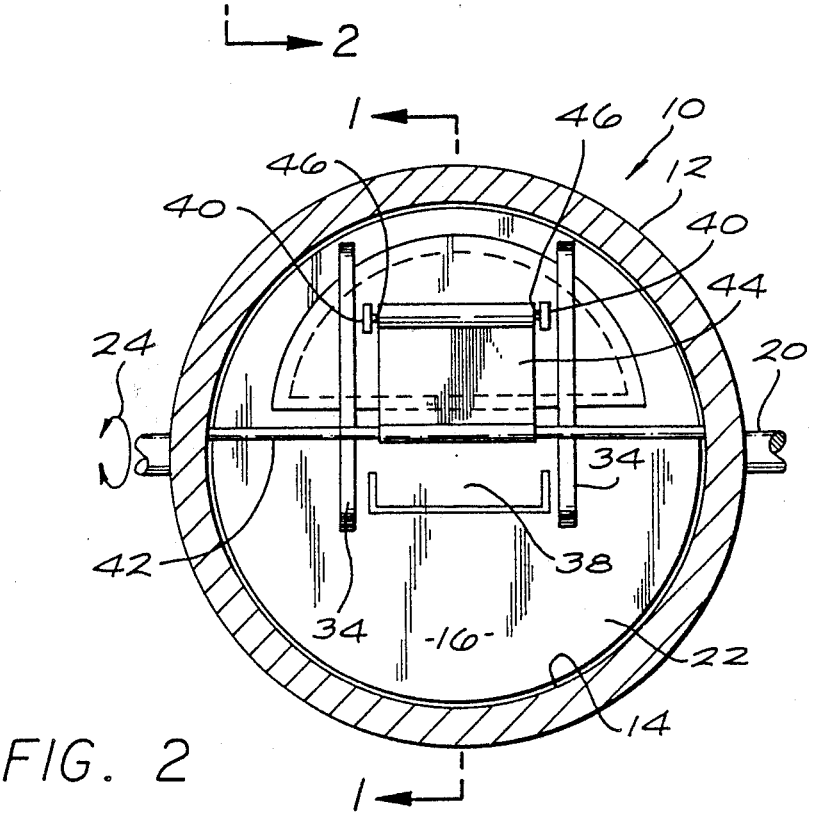
Figure 3:
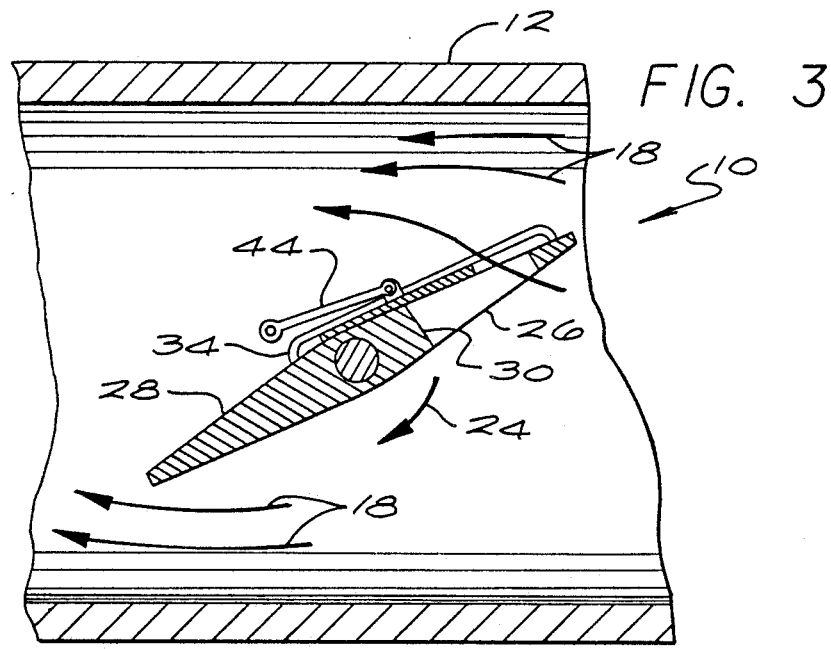
Figure 4:
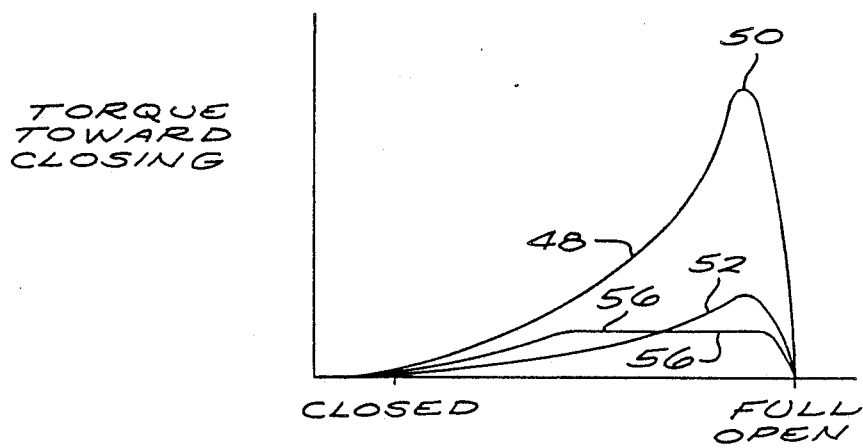
Figure 5:
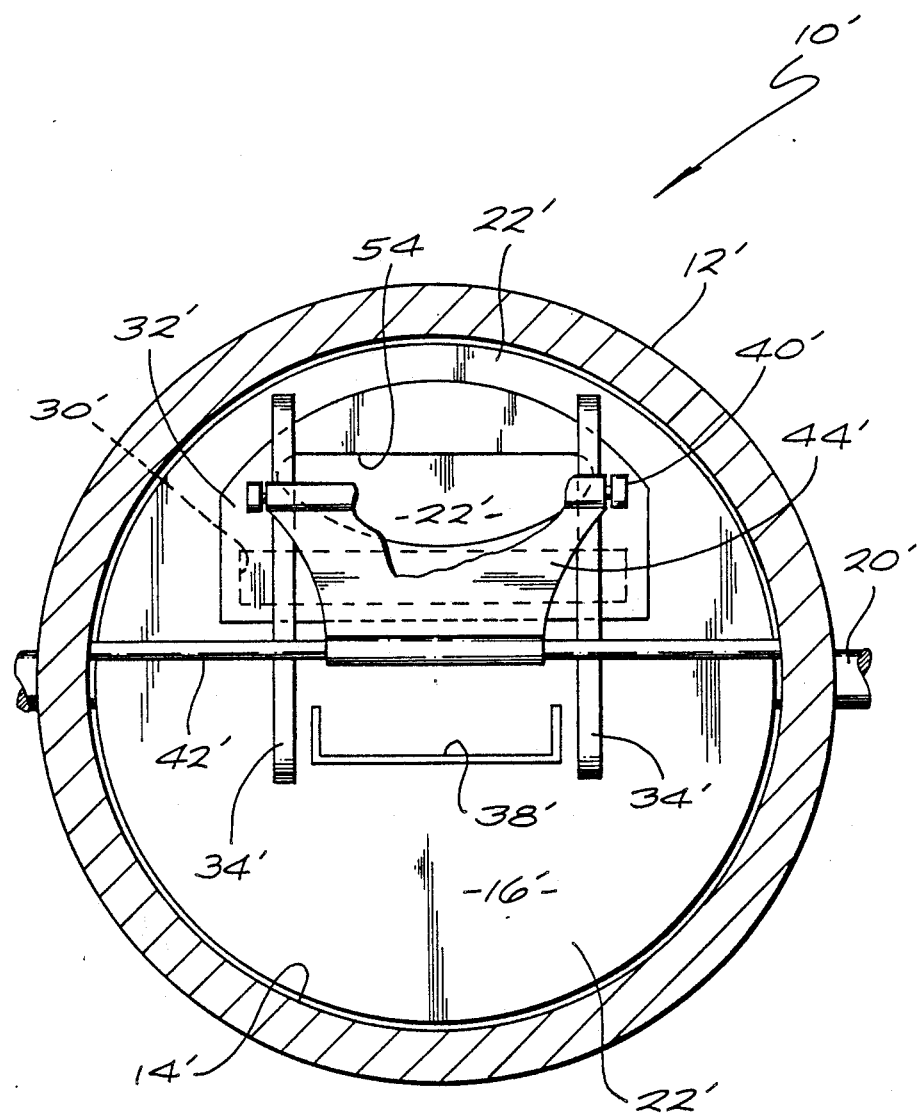

FIG. 1 provides a longitudinal cross-sectional schematic view of a valve device embodying the present invention, taken generally along line 1—1 of FIG. 2;

FIG. 2 depicts a cross-sectional view taken generally along line 2—2 of FIG. 1, and viewed in the direction of the arrows;

FIG. 3 provides a longitudinal cross-sectional view similar to FIG. 1, and showing parts of the valve device in alternative operative positions;

FIG. 4 provides a graphical representation of the operating torque for a valve device according to the invention as compared to a conventional butterfly valve; and FIG. 5 schematically depicts a transverse partially cross-sectional view similar to FIG. 2, and presenting an alternative embodiment of the invention.

FIG. 1 depicts a butterfly valve 10 embodying the present invention. The butterfly valve 10 includes a duct generally referenced with the numeral 12. The duct 12 has a circumferentially extending wall 14 defining a flow path 16 wherein is conducted a flow of fluid, as generally referenced by the numeral 18.

In order to control flow of fluid 18 in the flow path 16, a pivotal shaft 20 transacts the duct 12 and carries thereon a plate-like butterfly valve member generally referenced with the numeral 22. Viewing FIGS. 1 and 2 in conjunction with one another it will be seen that the shaft 20 extends outwardly of the duct 12 so that an operating torque, provided by a valve actuator (not shown, but generally referenced with the numeral 24) may be applied to the shaft 20 to pivotally position the butterfly plate 22 within the duct 12. Further it will be seen that in its first position depicted by FIGS. 1 and 2, the butterfly valve member 22 spans and closes the flow path 16 so as to prevent flow of fluid 18 therein.

While the present drawing figures are generally schematic in nature it will be understood by those skilled in the pertinent art that the plate-like butterfly valve member 22 in fact is a sealingly tight fit within the duct 12. Conventionally the butterfly valve member 22 carries a seal member at the outer periphery thereof. This seal member, which may be like a piston ring, O-ring, or lip seal, for example, is sealingly engageable with the wall 14 of the duct 12 in the first position of the butterfly plate member, as depicted by FIGS. 1 and 2. However, for ease of illustration in connection with the present description of the inventive valve device presented herein, this conventional sealing member has been omitted from the drawing figures. It will be further understood that it is conventional in the art of making butterfly valves to have the butterfly plate member skewed with respect to the axis of the shaft 20 so that the sealing member may be continuous circumferentially. That is, it is conventional for the shaft 20 to transact the duct 12 generally perpendicularly to the longitudinal axis thereof while the plane of the valve member 22 is generally angulated somewhat with respect to the axis of the shaft 20. As a result the plate-like valve member 22 lies generally upstream of the shaft 20 at one side thereof, and is generally downstream of the shaft 20 at the opposite side. These details of construction which are conventional in the butterfly valve art have been omitted from the present schematic drawings Figures for ease of illustrating the present invention. As depicted, the plate-like butterfly valve member 22 provides a circumferentially continuous outer periphery 22', which is interrupted only by the shaft 20. That is, the periphery 22' is free of notches, gaps, or breaks. However, a butterfly valve according to the invention may easily have the conventional construction details incorporated therein, and will then provide a valve member with a truly continuous outer periphery, whereat a circumferentially continuous sealing member may be carried.

It will be seen in viewing FIGS. 1 and 3 in conjunction that the butterfly valve member 22 includes a leading or upstream wing referenced with the numeral 26 and a trailing or downstream wing referenced with the numeral 28. Both of these wings are referenced with respect to the direction of fluid flow 18 and pivotal movement of the butterfly valve member 22 from its first or closed position as depicted in FIG. 1 toward an open or second position as depicted in FIG. 3. The leading wing 26 of the butterfly valve member 22 defines an aperture 30 therethrough. Viewing FIG. 2 it will be seen that the aperture 30 is generally of crescent shape and defines an area generally in the range of 20 percent to 60 percent of the area of the leading wing 26 of the butterfly valve member 22.

Slidably carried upon the butterfly plate member 22 is a secondary plate-like valve member 32. The plate-like secondary valve member 32 is generally matching in shape with the aperture 30, and in the first position of the valve member 22, it spans and closes the aperture 30 with respect to fluid flow therethrough. That is, the plate-like secondary valve member 32 is slidably and sealingly carried by and engaged with the downstream face of the leading wing 26 of the valve member 22. In order to ensure the sliding and sealing engagement of the plate-like secondary valve member 32 with the butterfly valve member 22, the latter includes a pair of elongate support members 34 which span over the secondary valve member and define a guideway 36 in combination with the butterfly valve member 22. Because the butterfly valve member 22 is somewhat diamond shaped in cross-section, as is best seen viewing FIGS. 1 and 3, the downstream face of the trailing wing 28 also defines a somewhat raised plateau 38 which cooperates with the support members 34 in defining the guideways 36. The plate-like secondary valve member 32 also includes a pair of spaced apart ears 40 extending away from the valve member 22. Viewing FIG. 2 it will be seen that these ears 40 are closely received between the transversely spaced apart support members 34 in order to transversely locate the secondary valve member 32 therebetween. Also spanning the duct member 12 spaced from the shaft 20 and butterfly valve member 22 is a secondary shaft or rod 42. The secondary rod 42 is substantially parallel with the shaft 20 and is spaced therefrom in order to provide pivotal connection for a transversely elongate link member 44 extending from the rod 42 to a pivot pin 46. The pivot pin 46 extends between the pair of ears 40 in order to provide pivotal connection of the link member with the secondary plate-like valve member 32.

Having observed the structure of the valve device 10, attention may now be directed to its operation. Viewing FIG. 1 it will be seen that in the first or closed position of the valve member 10 the butterfly plate member is disposed generally transverse to and spans the duct 14 in order to prevent flow of fluid 18 in the flow path 16. It further will be observed that the secondary plate-like valve member is in a respective first position fully closing the aperture 30 in the leading wing 26 of the butterfly valve member 22. That is, the secondary plate-like valve member spans and closes the aperture 30 in the respective first positions of the butterfly valve member and secondary valve member because of the positional relationship of the shaft 20 and rod 42 in combination with the length of the link 44 and position of the ears 40 upon the secondary valve member.

Viewing now FIG. 3 it will be seen that when a torque 24 is applied to the shaft 20 to pivot the butterfly valve member 22 away from its first closed position and toward its second or open position in which the butterfly plate member is angulated or non-transverse to the duct 12, the linkage including rod 42, link 44, pivot pin 46, and the ears 40, results in sliding of the secondary plate-like valve member relative to the butterfly valve number 22 so as to partially open the aperture 30. This partial opening of the aperture 30 results in a decrease in apparent area of the leading wing 26 as compared with the constant area of the trailing wing 28 of the butterfly valve member 22. As the aperture 30 is progressively opened with progressive movement of the butterfly valve member 22 toward a fully open position in which the plate member 22 is substantially parallel with duct 12, the effective area of the leading wing 26 is progressively decreased. The effect of this progressive decrease of effective or apparent area of the leading wing 26 in comparison with the trailing wing 28 is graphically depicted by FIG. 4.

Viewing FIG. 4 it will be seen that the curve 48 generally represents the type of opposing torque or closing torque curve which is experienced with a conventional butterfly valve. That is, the closing torque effective upon the butterfly plate member and which must be overcome by the valve actuation torque 24, increases markedly with movement of the butterfly plate member from its closed position toward the fully open position. This opposing torque of butterfly valves is well known in the art, and reaches a peak, referenced with the numeral 50, at about 70° to 80° open from the closed position, after which closing torque drops off rapidly. At the fully opened, or 90° position, opposing torque is minimal or zero. In contrast, the present butterfly valve apparatus is expected to display a considerably lower opposing torque throughout its full range of operating movement. This lower opposing torque is represented by the line 52 on the graph of FIG. 4. The characteristic of the opposing torque curve expected to be produced by the present inventive valve device is similar in nature to that experienced with a conventional butterfly valve, however, the opposing torque is considerably lower throughout all of the operating range of the valve.

When the valve member is pivoted back toward its closed position of FIG. 1 from an open position as depicted in FIG. 3, the closing torque assists this movement. However, it frequently is desired to modulate open and closed the angular position of a butterfly valve member in order to modulate a fluid flow. Alternatively, a controlled closing of the valve must be achieved. In either case, the valve actuator must sustain the closing torque generated by the butterfly valve member. Thus, achieving a reduced closing torque for a butterfly valve member is desirable even when closing of the valve is considered. Consideration of the linkage controlling the relative position of secondary valve 32 on butterfly valve 22 will reveal that the aperture 30 is progressively closed as the valve member 22 pivots toward its position shown in FIG. 1. As a result, the present inventive butterfly valve is expected to display a similar closing torque curve (line 52 of FIG. 4) during both closing and opening movement of the valve member.

FIG. 5 schematically depicts an alternative embodiment of the invention. In order to obtain reference numerals for use on FIG. 5, features which are analogous in structure or function to those of FIGS. 1-3 are referenced with the same numeral used previously, but with a prime added. The butterfly valve 10' of FIG. 5 includes a duct 12' with wall 14' defining a flow path 16' for flow of fluid 18'. A shaft 20' pivotally disposes a plate-like butterfly valve member 22' in the flow path 16' and extends outwardly of the duct 12' to receive operating torque 24'. The valve member 22' includes an upstream wing 26' and downstream wing 28', the former of which defines an aperture 30' therethrough. However, in contrast to the aperture 30 of FIGS. 1-3, the aperture 30' is slot-like (as illustrated, rectangular) and extends parallel to the shaft 22' in leading wing 26'.

A secondary valve member 32' is slidably carried on the valve member 22' by support members 34' defining a guideway 36' including a plateau 38'. Movement of the secondary valve member 32' is effected by ears 40' in concert with a secondary shaft 42' and link member 44' securing to the ears 40 via pivot pair 46'. However, in contrast to the valve member 32 of FIGS. 1-3, the valve member 32' defines a selectively shaped aperture 54 which may be moved into registry with the slot-like aperture 30'. The length of the aperture 30' is at least as great as the maximum length of aperture 54, as determined in a direction parallel to the shaft 20.

In the first or closed position of the valve member 22', the plate-like valve member 32' covers and closes the aperture 30'. As the valve member 22' is pivoted toward its open position, like that depicted in FIG. 3, the linkage of ears 40', shaft 42', link 44', and pivot pair 46' slides the valve member 30' downwardly, viewing FIG. 5, to progressively align or register aperture 54 with slot-like aperture 30'. As a result, the apertures 30', 54 cooperatively provide a varying open fluid flow area or channel through the valve member 22'. This channel has the effect of decreasing the effective area of the wing 26, while wing 28 remains of constant area.

A graph of the open area defined by the registration of aperture 54 with aperture 30' versus angular position of valve member 22 appears like graph line 48 of FIG. 4. In other words, the graph of open flow area through valve member 22 is selected to approximate the usual closing torque curve experienced with conventional butterfly valves. The result is a substantial decrease in the nonlinearity of the closing torque exerted on butterfly valve 10' by the fluid 18. This more linearized torque curve is represented by line 56 on the graph of FIG. 4, although an empirically established curve may vary somewhat from that represented. It will be seen viewing FIG. 4 that the peak closing torque which must be sustained or overcome by an actuator of valve 10' is reduced, and has a substantially linear portion where prior valves displayed a closing torque spike. The geometrical configuration of the aperture 54 may differ from that illustrated in FIG. 5. For example, the aperture 54 could have the shape defined by the combination of curve 50 (FIG. 4) and the reflection of the same curve about the abscissa indicated in FIG. 4.

Because of this comparatively lower closing or opposing torque provided by the present inventive valve device, an actuator having a lower peak torque capacity may be acceptable for operating the inventive valve. Such an actuator with a lower peak torque capacity is expected to be considerably smaller, lighter, and less expensive to manufacture, than the actuators required for operation of present conventional butterfly valves.

What is claimed is:

1. A butterfly valve comprising:
a duct member defining an axially extending fluid flow path therewithin;
a plate-like butterfly valve member disposed in said fluid flow path and pivotal about a generally transverse axis between a first position wherein said valve member is transverse of said duct to close said flow path and a second position wherein said valve member is substantially parallel with said duct to open said flow path;
said butterfly valve member including a pair of opposed wing portions on opposite sides of said pivot axis, a leading one of said pair of wing portions with respect to fluid flow in said duct and pivotal movement of said valve member toward said second position defining an aperture therethrough;
a secondary valve member carried by said butterfly valve member and movable between a first location closing said aperture and a second location opening said aperture to allow fluid flow therethrough; and
linkage means for moving said secondary valve member progressively between said first location and said second location in response to pivotal movement of said valve member between said respective first position and said second position;
wherein said secondary valve member comprises a plate-like member slidably carried by said butterfly valve member and sealingly engaging the latter at said aperture therein.

2. The invention of claim 1 wherein said linkage means includes a secondary transverse shaft member spaced from and generally parallel with said pivot axis, and a link member pivotally connecting respectively at its opposite ends with said secondary shaft member and with said plate-like secondary valve member.

3. The invention of claim 2 wherein said link member is elongate in the transverse direction parallel with said pivot axis and secondary shaft to guide said plate-like secondary valve member in sealing and sliding relation with said valve member.

4. The invention of claim 1 wherein said plate-like secondary valve member is disposed on a down-stream face of said butterfly plate member with respect to fluid flow in said flow path, said butterfly valve further including a bracket member spanning over said plate-like secondary valve member in spaced relation with said butterfly valve member, said bracket member disposing said secondary valve member in sliding and sealing relation with said butterfly valve member in opposition to fluid pressure effective thereon.

5. The invention of claim 4 wherein said butterfly valve includes another bracket member spaced from and substantially duplicative of said bracket member to form a pair of bracket members, said linkage means movably engaging between said pair of bracket members to limit lateral movement of said secondary valve member relative to said butterfly valve member and said aperture therein.

6. The invention of claim 1 wherein said aperture defines an area in the range from 20 percent to 40 percent or more of said leading wing portion.

7. The invention of claim 1 wherein said butterfly valve member defines a peripheral surface which is circumferentially continuous or interrupted only at said transverse pivot axis.

8. A butterfly valve comprising:
a duct member defining an axially extending fluid flow path therewithin;
a plate-like butterfly valve member disposed in said fluid flow path and pivotal about a generally transverse axis between a first position wherein said valve member is transverse of said duct to close said flow path and second position wherein said valve member is substantially parallel with said duct to open said flow path;
said butterfly valve member including a pair of opposed wing portions on opposite sides of said pivot axis, a leading one of said pair of wing portions with respect to fluid flow in said duct and pivotal movement of said valve member toward said second position defining an aperture therethrough;
a secondary valve member carried by said butterfly valve member and movable between a first location closing said aperture and a second location opening said aperture to allow fluid flow therethrough; and
linkage means for moving said secondary valve member progressively between said first location and said second location in response to pivotal movement of said valve member between said respective first position and said second position;
wherein said aperture and said secondary valve member cooperatively define a curve of open area versus movement of said butterfly valve member which approximates the shape of the closing torque curve of a conventional butterfly valve.

9. The invention of claim 8 wherein said secondary valve member defines an aperture therethrough moving progressively into registry with said aperture of said butterfly valve member in response to movement of said secondary valve member from said first to said second location.

10. The invention of claim 9 wherein said aperture of said secondary valve member is selectively shaped.

11. A butterfly valve apparatus comprising a duct member defining an axially extending fluid flow path, a transverse shaft member spanning said flow path and journaling on said duct member for pivotal relative movement in response to external actuating torque applied thereto, a butterfly valve member securing to said shaft member for pivotal movement therewith between a first position closing said flow path and a second position opening the latter, said butterfly valve member including a pair of opposite wing portions cooperatively defining a peripheral surface which is circumferentially continuous or interrupted only by said shaft, one of said wing portions defining an aperture therethrough, torque trimming valve means carried upon said butterfly plate member for opening and closing said aperture, and moving means for progressively closing and opening said torque trimming valve means in response to pivotal movement of said butterfly plate between its first and second positions, respectively, wherein said torque trimming valve means includes a plate-like secondary valve member relatively movably carried by said butterfly plate member and sealingly spanning said aperture in said first position of said valve means.

12. The invention of claim 11 wherein said torque trimming valve means and said means for moving cooperatively open said aperture in response to opening pivotal movement of said butterfly valve member to define a curve of open aperture area versus angle of said butterfly valve member which is of zero value when said butterfly valve member is closed in said first position and increases progressively throughout an opening angle of substantially 70° to 80°, whereby said open area versus valve angle curve approximates the closing torque curve of a conventional butterfly valve.

13. Butterfly valve structure including a body defining a flow path, a substantially planar butterfly valve member disposed in said flow path and pivotal about a generally medial axis transverse of said flow path between a first position wherein said valve member is transverse to and closing said flow path and a second position wherein said valve member is generally parallel with said flow path to open the latter for fluid flow therein, said butterfly valve member including a pair of opposite wing portions one of which is an upstream wing portion with respect to fluid flow and pivoting of said valve member toward said second position thereof, and area control means for in response to pivotal movement of said butterfly valve member from said first position to said second position progressively decreasing the effective area of said one wing portion upon which fluid pressure differential focuses may be effective below that area of the other of said pair of wing portions, wherein said area control means includes means progressively opening an aperture through said one wing portion, and wherein said one wing portion defines said aperture therethrough, and said area control means includes a sliding plate-like secondary valve member carried upon said butterfly valve member and spanning said aperture.

14. The invention of claim 13 further including said aperture and said plate-like valve member cooperating to define a curve of aperture open area versus pivotal angle of said butterfly member from said first position thereof, which curve progressively increases from zero throughout the first 70° to 80° of opening of said butterfly valve member, and said curve being concave upwardly to approximate the closing torque curve shape of a conventional butterfly valve, whereby said butterfly valve structure provides a closing torque curve having a substantially linear portion.

15. The invention of claim 14 wherein said aperture is of slot shape extending substantially parallel with said medial pivot axis of said butterfly valve member.

16. The invention of claim 15 wherein said plate-like valve member defines a second aperture progressively moving into registry with said aperture of said butterfly valve member, said second aperture being of a selected shape.

17. The invention of claim 13 wherein said area control means includes linkage means connecting with both said body and with said sliding plate-like valve member and moving the latter to respectively open and close said aperture in response to pivotal movement of said butterfly valve member toward and from said second position thereof.

18. The invention of claim 13 wherein said aperture defines an area from 20 percent to 40 percent or more of the total area of said one wing portion.

19. The invention of claim 13 wherein said axis is defined by a shaft pivotally carried by said body and drivingly securing to said butterfly valve member for pivotal movement therewith, said shaft extending outwardly of said body to receive actuating torque applied thereto.

20. The invention of claim 13 wherein said butterfly valve member defines a peripheral surface which is continuous or interrupted only proximate said medial pivot axis.

* * * * *